April 21, 1964     K. E. ROLLEFSON     3,129,490

CAPACITOR AND METHOD OF MAKING SAME

Filed Jan. 30, 1957     2 Sheets-Sheet 1

INVENTOR.
Karl E. Rollefson
BY Olson & Trexler
attys.

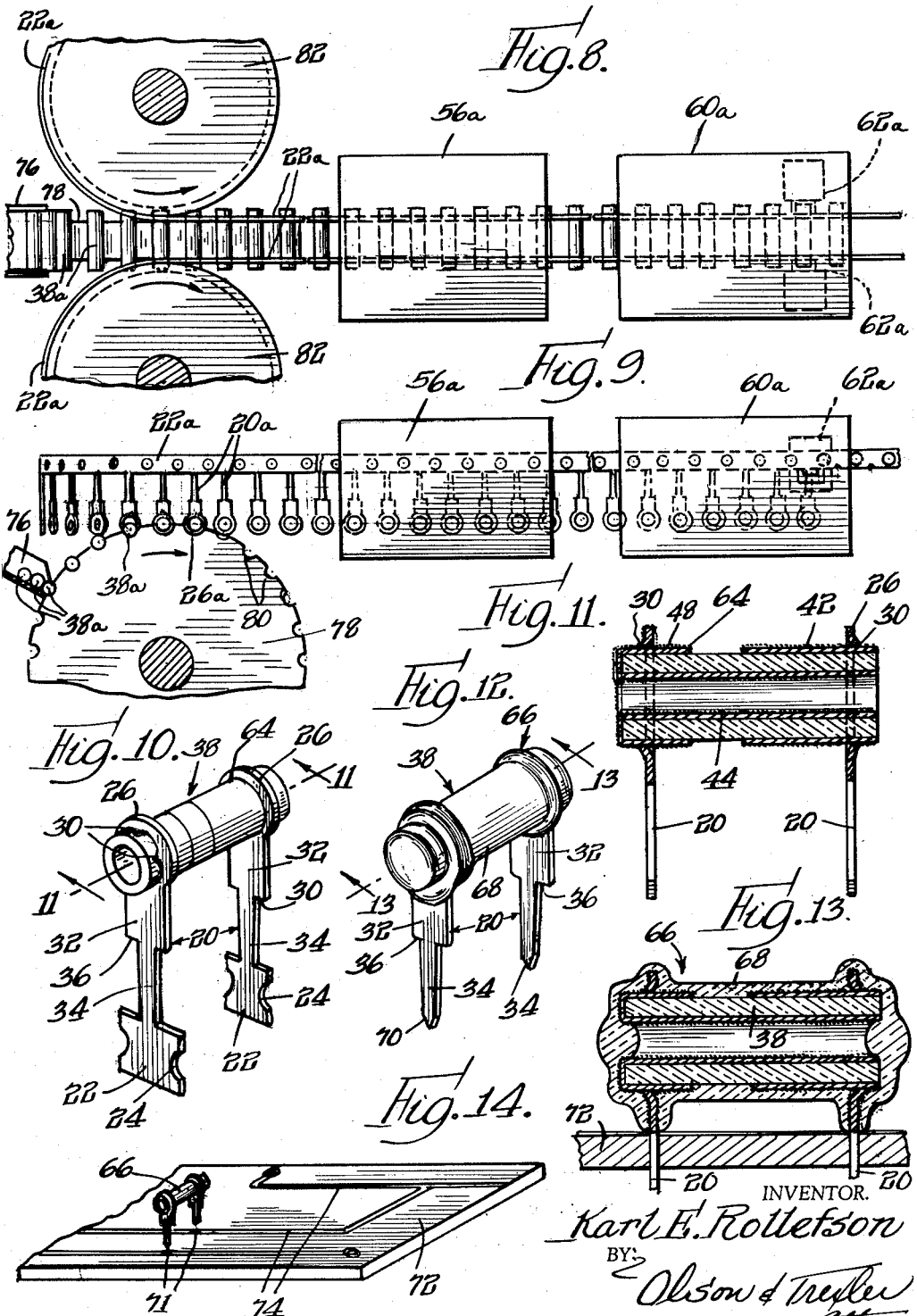

United States Patent Office 3,129,490
Patented Apr. 21, 1964

3,129,490
CAPACITOR AND METHOD OF MAKING SAME
Karl E. Rollefson, Evanston, Ill., assignor to The Muter Company, Chicago, Ill., a corporation of Illinois
Filed Jan. 30, 1957, Ser. No. 637,189
6 Claims. (Cl. 29—25.42)

This invention is concerned generally with the art of electrical circuit components, and more particularly with an improved method for manufacturing capacitors, and the capacitor resulting therefrom.

Tubular ceramic capacitors, those in which a conductive coating is provided on the inner surface and on the outer surface of a ceramic tube, present certain advantages over competitive capacitors of equivalent capacitance. They take up a minimum of room, particularly in the height they extend above a workpiece, such as a printed circuit panel, and they are easily controlled within rather precise limits as to the amount of capacity.

This invention is concerned with a capacitor or condenser of the tubular ceramic type, and one object of the invention is to provide an improved capacitor of this type.

Another object of this invention is to provide an improved tubular ceramic capacitor which is readily assembled with a work part, such as a printed circuit panel.

An important object of this invention is to provide an improved method or process for producing tubular ceramic capacitors.

More specifically, it is an object of this invention to provide a process for rapidly fabricating a large number of tubular ceramic capacitors, but acting on a large number of parts to be assembled either substantially simultaneously or sequentially.

Other and further objects and advantages of the present invention will be apparent from the following description when taken in connection with the accompanying drawings wherein:

FIG. 8 is a top view corresponding to FIG. 5 and showing a modification of the process in which the parts are assembled sequentially;

FIG. 9 is a side view corresponding to FIG. 8;

FIG. 10 is a perspective view of a capacitor in one stage of manufacture;

FIG. 11 is a longitudinal sectional view through the capacitor of FIG. 10 as taken along the line 11—11 in FIG. 10;

FIG. 12 is a perspective view of the finished capacitor;

FIG. 13 is a longitudinal sectional view therethrough as taken along the line 13—13; and FIG. 14 is a perspective view showing the manner in which the capacitor is assembled with another part, such as a printed circuit board.

Referring now in greater particularity to the drawings, and first to FIGS. 1–4, there will be seen a plurality of capacitor or condenser terminals generally identified by the numeral 20 connected to strips 22. As will be apparent with reference to FIG. 1, a pair of strips 22 and confronting or substantially interlocking terminals 20 readily can be stamped from a single strip of sheet metal stock without substantial waste. The strips 22 are provided with pilot holes 24 in accordance with standard punch press practice, and further explanation of the punching operation is believed unnecessary.

Figure 1:
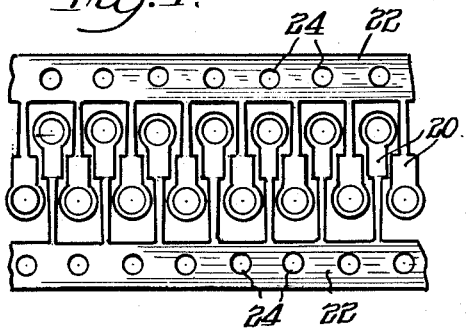
FIG. 1 is a plan view showing the terminal parts for a capacitor as stamped from a blank.
Figure 3:
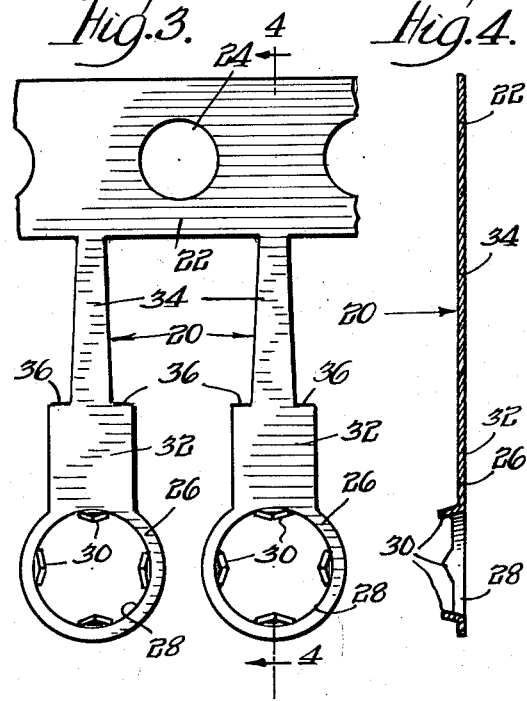
FIG. 3 is a view similar to a portion of FIG. 2 but on a greatly enlarged scale.
Figure 4:
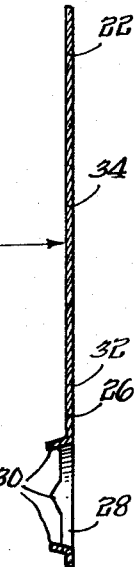
FIG. 4 is a cross sectional view taken substantially along the line 4—4 of FIG. 3.
Figure 2:
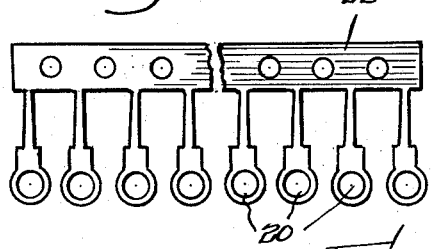
FIG. 2 is a plan view of one strip or group of terminals.

Each terminal, as seen particularly in FIGS. 3 and 4, comprises a circular head 26 having a circular aperture 28 therein, the aperture being provided with deflected protuberances or prongs 30 for forming an aggressive contact with a capacitor or condenser, as hereinafter will be brought out. The head 26 is integral with a generally rectangular body 32, and each body 32 is joined by an integral shank 34 to one of the strips 22, the terminals being in spaced relation, as will be apparent. The bodies 32 are joined to the shank 34 at shoulders 36, and the shanks preferably are slightly tapered, being wider at the junction with the body 32 than with the strip 22. The slight taper facilitates assembling of the finished capacitor or condenser with an article such as a printed circuit board.

Figure 7:
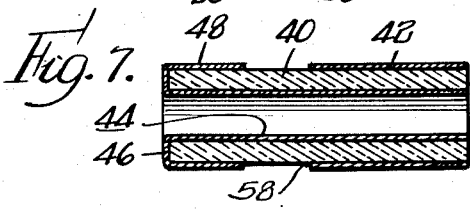
FIG. 7 is a longitudinal sectional view through the coated tube going into one of the capacitors as taken along the line 7—7 in FIG. 5.

As hereinafter will be set forth, the terminals 20 are assembled with tubular ceramic capacitor elements 38 (see FIG. 7). The tubular ceramic capacitor elements are well known in the art, and each comprises a ceramic tube 40 provided with an external metallic coating 42 extending over somewhat more than half of the length of the tube, and with an interior coating 44 extending throughout the length of the tube, and continuing over one end thereof at 46 to a short external coating 48 for connection with a terminal. The coating can be provided in any suitable manner known in the art, such as by painting, or electro depositing.

Figure 5:
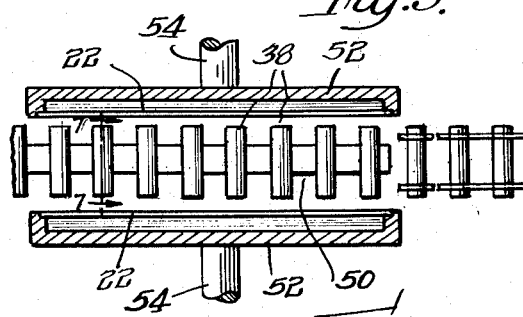
FIG. 5 is a top view, partly in section, showing the assembling and subsequent handling of capacitors during the assembling thereof.
Figure 6:
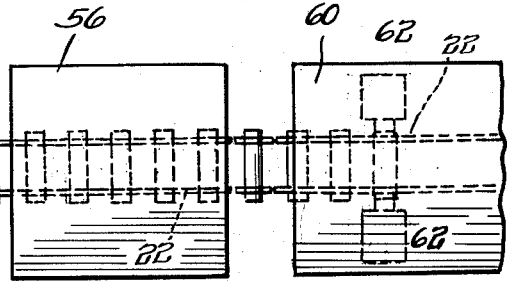
FIG. 6 is a side view corresponding to FIG. 5.
Figure 6:
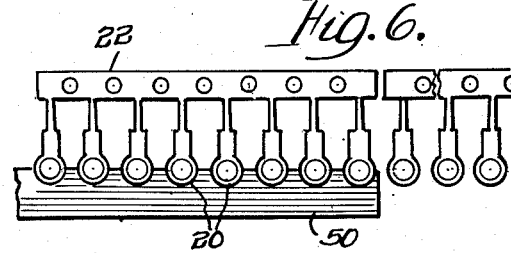

Reference now should be had to FIGS. 5 and 6, wherein one exemplification of the process of this invention is illustrated. In accordance with this example, two strips 22 are supported with the terminals 20 depending therefrom. The opposite terminals are aligned with one another, and a rack 50 is utilized to support a series of condenser elements 38 in parallel, spaced apart relation, and in alignment with the apertures 28 of the terminal head. Although the number of terminals and condenser or capacitor elements has been shortened for illustrative purposes, it is contemplated that 50 capacitor elements would be supported by a rack two feet long, with a corresponding number of terminals on opposite sides thereof. Shiftable pressure members 52 are provided on opposite sides of the strips and capacitor elements, and are arranged for actuation through connecting rods 54 by means of pneumatic pistons or the like to approach one another for pressing the terminals, while still attached to the strips 22, onto the capacitor elements.

Various additional operations are carried out on the assembled terminals and capacitor elements while still attached to the strips 22. For example, it is desirable that the terminals be soldered to the coatings 42 and 48, even though the prongs 30 form a good mechanical and electrical contact therewith. Thus, as is illustrated somewhat schematically at 56, the capacitor elements and the heads of the terminals and also preferably the bodies and shanks thereof up to the strips 22 are passed through a solder bath. As will be understood, the solder will adhere to all of the metal parts, including the coatings 42 and 48, and the terminals, but will not adhere to the bare ceramic material between the coatings 42 and 48, as at 58 in FIG. 7. The solder coating on the shanks and on the heads forms a desirable tinning for the subsequent soldering operations necessary in installing the finished capacitors.

Various additional operations also may be preformed on the capacitors while still attached to the strips 22. For example, the capacitors may be cleaned, they preferably are coated with insulating material such as phenolic cement, or with wax or the like, and the coated capacitors can be heat treated for hardening the coating, and then the coated capacitors preferably are color coded or printed. All of these operations preferably are preformed on the capacitors, substantially in the order set forth, although not all of the steps are specifically illustrated since the details thereof are immaterial. Indeed, it could be considered that all of the enumerated steps are carried out within the box 56.

As a final step, the finished capacitors are severed from the strips 22. This is illustrated somewhat schematically within a box 60, severing elements 62 being provided on the opposite sides of the path of the strips and capacitors. Only one pair of severing elements is illustrated, and it will be understood that either this pair would act sequentially on all of the terminals, or preferably there would be provided a great number of severing elements for simultaneously shearing all of the terminals from the strips. Preferably, the shearing elements are such as to provide pointed tips on the terminals for facilitating assembling of the capacitors with additional parts, such as a printed circuit board.

Reference now should be had to FIGS. 10-13 for a more concise illustration of the article or product resulting from the process now disclosed. As shown in FIGS. 10 and 11, the terminals 20 have been assembled with the capacitor element 38, and the assembly has been dipped in solder substantially up to the strips 22, thus providing a thin solder coating 64 over the metallic parts, with the exception of the strips 22. As will be apparent, the parts have been inverted in FIGS. 10 and 11 so as to show their position corresponding to the position of the ensuing three figures. The final capacitor 66 after the application and hardening of the phenolic cement or insulating material indicated at 68, is shown in FIGS. 12 and 13. As previously noted, the ends of the terminals are cut off to provide a tapered or wedged tip 70, and this, coupled with the slight taper of the shanks 34, greatly facilitates insertion of the terminal shanks, as into apertures 71 in the printed circuit board 72 shown in FIG. 14. The printed circuits are indicated in this figure somewhat generally at 74. After such insertion of the terminal shanks, the shanks preferably are soldered in place, and it will be appreciated that the solder coating on the shanks facilitates such soldering.

The process as hereinbefore described, is in the nature of a "batch" process in that operations simultaneously are preformed on a large number of terminals and capacitor elements. It is within the province of this invention to provide more or less sequential or overlapping process steps on a succession of terminals and capacitor elements. Such a modification of the invention is illustrated in FIGS. 8 and 9.

In accordance with this embodiment of the invention, similar numerals being utilized to identify similar parts, with the addition of the suffix a, a succession of capacitor elements 38a is rolled down a chute 76 onto a conveyor 78. The conveyor, in this instance, takes the form of a disc having arcuately spaced recesses 80 about the edge thereof for receiving the capacitor elements 38a. The conveyor 78 raises the capacitor elements 38a into alignment with the heads 26a of terminals 20a conveyed by the strips 22a.

The strips 22a and the terminals 20a carried thereby are brought around conveyors 82, in this case taking the form of opposed, spaced apart rotating wheels or discs, into converging relation. As will be understood, the discs 82 are rotated in timed relation with one another, and in timed relation to the disc 78, whereby the terminal heads 26a are pressed over the ends of the capacitor elements 38a. As will be understood, the wheels or discs preferably would be much larger in radius than shown, or other types of conveyors could be used, so that the capacitor elements and terminals would converge rather gradually, and not too rapidly.

The assembled terminals, while still attached to the strips, and the capacitor elements then are passed through a box 56a, in which solder may be applied, for instance, by dipping, somewhat in the manner previously disclosed. The strips, terminals, and capacitor elements continue through the box 56a, and through one or more boxes, including the box 60a for further treatment as previously described, including coating, color coding or printing, the strips finally being severed as at 62a to provide the finished capacitors. The finished capacitors may be allowed to drop into the box 60a, or from the end of the box, or onto any suitable conveyor mechanism (not shown).

Two examples of an improved process for manufacturing capacitors have now been disclosed, along with the improved resulting product. It will be understood that the examples as set forth herein are by way of illustration only, and that various changes can be made within the scope of the invention as set forth in the following claims.

The invention is claimed as follows:

1. The process of manufacturing electric circuit elements which comprises positioning a succession of discrete elongated impedance elements in side-by-side spaced apart coterminous parallel relation, positioning a strip of material having transverse terminals integal therewith adjacent corresponding ends of said elongated impedance elements and transverse of the respective elements, positioning a like second strip having transverse terminals integral therewith displaced from the opposite corresponding ends of said impedance elements and parallel to the first-mentioned strip, all of said terminals thereby being precisely positioned parallel to one another and transverse of said impedance elements, the terminals attached to the two strips corresponding in number and spacing, aligning the terminals of the opposite strips with one another and with the impedance elements, and moving the strips and aligned terminals toward one another to assemble the aligned terminals with said impedance elements endwise thereof, and severing terminals from the strips subsequent to the assembly of the terminals with the impedance elements.

2. The process of manufacturing electric circuit elements as set forth in claim 1 and including the further step of supporting the impedance elements and terminals by the strips and dipping them into a liquid after movement of the terminals onto said impedance elements and before severing of the terminals from the strips.

3. The process of manufacturing electric circuit elements as set forth in claim 2 wherein the steps and dipping comprises coating the terminals and at least part of the impedance elements with solder.

4. The process of manufacturing electric circuit elements as set forth in claim 3 which includes the further step of coating the circuit element with an insulating material subsequent to the solder coating step and prior to the severing of the terminals from the strips.

5. The process of manufacturing electric circuit elements as set forth in claim 4 wherein pairs of terminals are moved onto impedance elements in succession, and wherein the terminals are severed from the strips in succession.

6. The process of manufacturing electric circuit elements which comprises positioning a succession of discrete elongated impedance elements in side-by-side spaced apart coterminous parallel relation, positioning strips of conductive material having terminals integral therewith adjacent corresponding ends of said elongated impedance elements and transverse of the respective elements, the terminals projecting from said strips parallel to one another and transverse of said elements and having apertured free ends, aligning the apertured free ends of the terminals respectively with the impedance elements, moving the strips with the aligned apertured free ends of the terminals and the impedance elements relatively toward one another into telescoping relation, and subsequently severing the terminals from the strips.

References Cited in the file of this patent

UNITED STATES PATENTS

| | | |
|---|---|---|
| 1,926,842 | Dubilier | Sept. 12, 1933 |
| 2,023,517 | Creager | Dec. 10, 1935 |
| 2,427,417 | Prickett | Sept. 16, 1947 |
| 2,522,713 | Gray | Sept. 19, 1950 |
| 2,615,946 | Katzman | Oct. 28, 1952 |
| 2,640,871 | Carbary | June 2, 1953 |
| 2,673,972 | Minnium | Mar. 30, 1954 |
| 2,766,510 | Heibel | Oct. 16, 1956 |
| 2,830,698 | Coda et al. | Apr. 15, 1958 |
| 2,929,130 | Packman | Mar. 22, 1960 |

UNITED STATES PATENT OFFICE
CERTIFICATE OF CORRECTION

Patent No. 3,129,490                      April 21, 1964

Karl E. Rollefson

It is hereby certified that error appears in the above numbered patent requiring correction and that the said Letters Patent should read as corrected below.

Column 4, line 26, for "integal" read -- integral --; line 59, for the claim reference numeral "4" read -- 1 --.

Signed and sealed this 8th day of September 1964.

(SEAL)
Attest:

ERNEST W. SWIDER
Attesting Officer

EDWARD J. BRENNER
Commissioner of Patents